United States Patent
Persson et al.

(10) Patent No.: US 10,065,543 B2
(45) Date of Patent: Sep. 4, 2018

(54) HEATING AND VENTILATION INLAY FOR A VEHICLE SEAT

(71) Applicant: KONGSBERG AUTOMOTIVE AB, Mullsjoe (SE)

(72) Inventors: Mattias Persson, Jonkoping (SE); Milan Tuskes, Munich (DE); Cristian Leu, Freising (DE)

(73) Assignee: KONGSBERG AUTOMOTIVE AB, Mullsjoe (SE)

( * ) Notice: Subject to any disclaimer, the term of this patent is extended or adjusted under 35 U.S.C. 154(b) by 45 days.

(21) Appl. No.: 15/275,781

(22) Filed: Sep. 26, 2016

(65) Prior Publication Data
US 2017/0096088 A1    Apr. 6, 2017

(30) Foreign Application Priority Data
Oct. 1, 2015  (DE) .......................... 10 2015 116 689

(51) Int. Cl.
*B60N 2/56*   (2006.01)

(52) U.S. Cl.
CPC ......... *B60N 2/5642* (2013.01); *B60N 2/5657* (2013.01); *B60N 2/5678* (2013.01)

(58) Field of Classification Search
CPC ... B60N 2/5642; B60N 2/5678; B60N 2/5657
See application file for complete search history.

(56) References Cited

U.S. PATENT DOCUMENTS

| | | | | |
|---|---|---|---|---|
| 3,691,569 A * | 9/1972 | Ikada | ..................... | A47C 23/00 |
| | | | | 277/936 |
| 4,044,221 A * | 8/1977 | Kuhn | ..................... | H05B 3/342 |
| | | | | 219/217 |
| 4,413,857 A * | 11/1983 | Hayashi | ................... | A47C 7/74 |
| | | | | 297/180.11 |
| 4,865,379 A * | 9/1989 | Aoki | .................... | B60N 2/5685 |
| | | | | 297/180.12 |
| 4,946,220 A * | 8/1990 | Wyon | ..................... | A47C 7/74 |
| | | | | 297/180.13 |
| 5,002,336 A * | 3/1991 | Feher | ..................... | A47C 7/744 |
| | | | | 297/180.13 |
| 5,902,014 A * | 5/1999 | Dinkel | ................. | B60N 2/5635 |
| | | | | 297/180.1 |

(Continued)

FOREIGN PATENT DOCUMENTS

WO    2014058429 A1    4/2014

*Primary Examiner* — James M Ference
(74) *Attorney, Agent, or Firm* — Cantor Colburn LLP (57) ABSTRACT

The present invention is directed to a heating and ventilation inlay for a vehicle seat that is adapted to be placed in a recess in a seat cushion or backrest of the vehicle seat underneath a seat trim. The heating and ventilation inlay comprises an arrangement of layers including an air permeable heating mat having a heating conductor running on the heating mat. Underneath the heating mat an air permeable layer of spacer material is connectable to a fan or suction fan for transporting air through the heating and ventilation inlay. The heating mat and the layer of spacer material are connected to each other and form a composite that can be handled as a unitary component, by a plurality of rivets which are distributed over the area of the heating and ventilation inlay. The rivets are pierced through the heating mat and the spacer material layer.

20 Claims, 7 Drawing Sheets

(56) References Cited

U.S. PATENT DOCUMENTS

| | | | | |
|---|---|---|---|---|
| 5,934,748 A * | 8/1999 | Faust | B60N 2/5635 | 297/180.1 |
| 6,003,950 A * | 12/1999 | Larsson | A47C 7/74 | 297/180.13 |
| 6,489,595 B1 * | 12/2002 | Check | B29C 65/02 | 219/202 |
| 6,511,125 B1 * | 1/2003 | Gendron | A47C 7/742 | 297/180.11 |
| 6,578,910 B2 * | 6/2003 | Andersson | A47C 7/74 | 297/180.11 |
| 6,629,724 B2 * | 10/2003 | Ekern | B60N 2/5635 | 297/180.11 |
| 6,629,725 B1 * | 10/2003 | Kunkel | B60N 2/5635 | 297/180.12 |
| 6,808,230 B2 * | 10/2004 | Buss | B60N 2/5657 | 297/180.12 |
| 6,857,697 B2 * | 2/2005 | Brennan | A47C 7/74 | 297/180.12 |
| 6,869,140 B2 | 3/2005 | White et al. | | |
| 7,261,371 B2 * | 8/2007 | Thunissen | B60N 2/56 | 297/180.14 |
| 7,338,117 B2 * | 3/2008 | Iqbal | A47C 7/72 | 297/180.11 |
| 7,370,911 B2 * | 5/2008 | Bajic | B60N 2/5635 | 297/180.11 |
| 7,931,330 B2 * | 4/2011 | Itou | B60N 2/5635 | 297/180.14 |
| 8,253,071 B2 * | 8/2012 | Weiss | H05B 1/0238 | 219/202 |
| 8,507,831 B2 * | 8/2013 | Howick | B60N 2/5678 | 219/210 |
| 8,544,942 B2 * | 10/2013 | Lazanja | B60N 2/5685 | 219/202 |
| 8,814,262 B2 * | 8/2014 | Abe | A47C 7/74 | 297/180.11 |
| 9,085,255 B2 * | 7/2015 | Krobok | B60N 2/5642 | |
| 9,139,118 B2 * | 9/2015 | Berroth | B60N 2/5635 | |
| 2002/0096931 A1 * | 7/2002 | White | B60N 2/5635 | 297/452.42 |
| 2004/0036326 A1 * | 2/2004 | Bajic | B60N 2/56 | 297/180.14 |
| 2004/0189061 A1 * | 9/2004 | Hartwich | B60N 2/56 | 297/180.14 |
| 2004/0245811 A1 * | 12/2004 | Bevan | A47C 7/425 | 297/180.12 |
| 2005/0173950 A1 * | 8/2005 | Bajic | A47C 7/72 | 297/180.14 |
| 2006/0158011 A1 * | 7/2006 | Marlovits | A47C 7/02 | 297/180.1 |
| 2007/0040421 A1 * | 2/2007 | Zuzga | B60N 2/5621 | 297/180.13 |
| 2007/0158981 A1 * | 7/2007 | Almasi | A47C 7/74 | 297/180.12 |
| 2009/0033130 A1 * | 2/2009 | Marquette | A47C 7/74 | 297/180.15 |
| 2009/0051196 A1 * | 2/2009 | Ishii | H05B 3/146 | 297/180.12 |
| 2009/0134675 A1 * | 5/2009 | Pfahler | B60N 2/5635 | 297/180.1 |
| 2009/0146470 A1 * | 6/2009 | Thompson | B60N 2/002 | 297/180.12 |
| 2010/0327636 A1 * | 12/2010 | Stoll | B60H 1/00285 | 297/180.1 |
| 2011/0109128 A1 * | 5/2011 | Axakov | A47C 7/744 | 297/180.1 |
| 2011/0221242 A1 * | 9/2011 | Juric | B60N 2/5635 | 297/180.1 |
| 2012/0080911 A1 * | 4/2012 | Brykalski | A47C 7/744 | 297/180.15 |
| 2012/0315132 A1 * | 12/2012 | Axakov | B60N 2/5635 | 415/182.1 |
| 2013/0043320 A1 * | 2/2013 | Zhang | B60N 2/5621 | 237/28 |
| 2013/0200661 A1 * | 8/2013 | Klusmeier | B29C 70/088 | 297/180.12 |
| 2014/0175078 A1 * | 6/2014 | Davignon | B32B 3/06 | 219/204 |
| 2014/0203603 A1 * | 7/2014 | Line | B60N 2/64 | 297/218.1 |
| 2015/0079892 A1 * | 3/2015 | Bauer | B60N 2/5642 | 454/120 |
| 2015/0145303 A1 * | 5/2015 | Line | B60N 2/643 | 297/283.3 |
| 2016/0016495 A1 * | 1/2016 | Tuskes | B60N 2/5685 | 297/180.12 |
| 2016/0152111 A1 * | 6/2016 | Tuskes | B60N 2/5685 | 219/217 |
| 2017/0096088 A1 * | 4/2017 | Persson | B60N 2/5642 | |
| 2017/0361744 A1 * | 12/2017 | Persson | B60N 2/44 | |

* cited by examiner

HEATING AND VENTILATION INLAY FOR A VEHICLE SEAT

CROSS REFERENCE TO RELATED APPLICATIONS (IF APPLICABLE)

The present application claims the benefit of German Patent Application No 102015116689.5 filed on Oct. 1, 2015, the contents of which are incorporated by reference herein.

BACKGROUND OF THE DISCLOSURE

The subject matter disclosed herein relates to a heating and ventilation inlay for a vehicle seat, which heating and ventilation inlay is adapted to be placed in a complementary recess in a seat cushion or backrest of the vehicle seat to be disposed underneath a seat trim, wherein the heating and ventilation inlay comprises an arrangement of layers including an air permeable heating mat having a heating conductor running on the heating mat, and underneath the heating mat an air permeable layer of spacer material which is connectable to a fan or suction fan for transporting air conveyed by the fan or suction fan through the area of the heating and ventilation inlay.

Such a heating and ventilation inlay is known from WO 2014/058429 A1 which describes a vehicle seat having as usual a seat cushion and a backrest connected thereto. For reasons of comfort the vehicle seat is provided with a seat heating and with a ventilation arrangement by which air transported by a fan or suction fan is transported through the seat trim. For this purpose the cushion material of the seat body is provided with a recess in the seating area, in which recess a heating and ventilation inlay can be placed. The recess has a contour which is complementary to the outer contour of the heating and ventilation inlay. The heating and ventilation inlay has a lower, air permeable layer of spacer fabric, on top of which a heating mat is disposed which is in contact with an inner surface of a seat trim. A conduit extends through the cushion material of the seat body from below into the recess, which conduit is in communication with a fan or a suction fan. In the following, for simplifying formulations, reference is made to a fan, wherein this is intended to also include a reversely operating suction fan. During operation of the fan air is conveyed through the conduit into the recess, which air is distributed by the air permeable layer of spacer fabric and which continues to flow through the heating mat and the seat trim.

Spacer fabrics or spacer nettings are three-dimensional textiles which in general comprise two cover layers which are connected by so-called pile yarns and which are held at a distance to each other. The spacer fabrics are knitted or woven fabrics which are extended to three-dimensions and which have a high air permeability due to the interstices between the filaments or yarns. The function of the air permeable spacer fabric layer is to keep open flow paths over the entire area of the spacer fabric layer such that air transported by the fan (or suction fan) may be distributed over the area of the spacer fabric layer, even if a passenger is seated on the vehicle seat and the weight of the passenger weighs on the spacer fabric layer. Spacer fabrics are also referred to as "spacer materials" or "mesh materials". For the heating and ventilation inlay described in WO 2014/058429 A1 the spacer fabric layer is referred to as a honeycomb support structure.

Above the air permeable spacer fabric layer an air permeable heating mat is disposed. Between the spacer fabric layer and the heating mat an air permeable cushion layer can be placed so that a passenger sitting on the vehicle seat does not feel the spacer fabric layer through the thin heating mat. The heating mat comprises for example a carrier layer of fleece, felt or woven material, on which carrier layer a heating conductor is laid; the heating conductor can be laid on the carrier layer running back and forth, in a meander pattern or with several parallel conductors. The heating conductor can be connected to a direct current source. The current supply to the heating conductor and the operation of the fan or suction fan are controlled by control units which may be connected to manual input elements for adjusting heating and ventilation.

Also the backrest has in its base body a recess in the cushion material facing the back of a passenger when seated, in which recess a heating and ventilation inlay is placed and connected before the seat trim is applied. In the vehicle seat described the spacer fabric layers and the heating mats are separate components which are mounted one after the other.

It has already been recognized that it would be desirable to integrate the heating mat and the air permeable spacer fabric layer required for ventilation already in advance during manufacturing to a united assembly or unit which is then shipped as a unit and mounted in the vehicle seat as a unit. Such an integrated heating and ventilation inlay is disclosed in U.S. Pat. No. 6,869,140 B2. The heating and ventilation inlay comprises an air permeable spacer fabric layer and lying on top of that an electrical heating mat. For integration these are enclosed in a bag of air impermeable material, which bag enwraps the heating and ventilation inlay. The bag is connected to a conduit connectable to a fan, and is, in the surface area which after mounting in the vehicle seat is in contact with the seat trim, provided with a plurality of holes. During operation of the fan, depending on the operation mode regarding the pumping direction as a fan or suction fan, air is forced into the air impermeable bag or is drawn from the bag which results in an air flow through the holes on the top surface of the bag and through the seat trim disposed on top of the bag. Since there are only individual, distributed holes in the upper surface of the bag, the flow resistance which is created by this heating and ventilation inlay is rather high, i.e. a fan having high capacity or performance is needed in order to be able to pump a sufficient amount of air through the heating and ventilation inlay.

BRIEF DESCRIPTION OF THE DISCLOSURE

An embodiment is provided to arrange a heating and ventilation inlay in such a manner that it can easily be integrated into a unit during fabrication such that it can be shipped as a unit and installed as a unit, wherein the integration to a unit should not be accompanied by an increased flow resistance for air to be pumped through the heating and ventilation inlay.

In another embodiment, the heating and ventilation inlay comprising the features of claim 1 and in the dependent claims.

According to the present invention the heating mat and the spacer fabric layer are connected to each other by a plurality of rivets which are distributed over the area of the heating and ventilation inlay and which are pierced through the heating mat and the spacer fabric layer, wherein the heating mat and the spacer fabric layer in this manner form a composite that can be handled as a unit. Each rivet has an elongated stem which extends through the heating mat and the spacer fabric layer in the direction of their thickness and which on each of its opposite ends has a laterally enlarged head portion, which head portions are in abutment on the outer surface of the heating mat and on the lower surface of the spacer fabric layer, respectively. Due to the distributed placement of the rivets the heating mat and the spacer fabric layer are connected in a reliable manner, without causing any significant increase in flow resistance for air which is transported through the spacer fabric layer and the heating mat.

In an embodiment an intermediate layer of reticulated foam is disposed between the heating mat and the spacer fabric layer, which reticulated foam layer is likewise pierced by the rivets connecting the heating mat and the spacer fabric layer. In this manner a durable compound or composite of three layers is formed. The reticulated foam layer is air permeable and is intended to improve the seating comfort by making the spacer fabric layer less noticeable for a passenger. It is of course possible to include further layers in the layer composite of the heating and ventilation inlay.

In another embodiment, an intermediate layer of reticulated foam an intermediate layer of perforated foam can be used. In an embodiment, the size (diameter) of the perforations and the number of perforations per unit area can be chosen as varying over the area of the intermediate layer in such a manner to achieve a desired distribution of the air flow.

In another embodiment the rivets are made of plastics. In particular plastic rivets are desired which are also referred to as tag pins. Such tag pins are frequently used in textile industries in order to attach tags or labels to clothing articles. Such tag pins consists of a thin plastic strand or filament which is provided on its opposite ends with laterally projecting elements or heads. Such tag pins are very cost-efficient and can be inserted by a machine for connecting the heating mat to the spacer fabric layer.

In another embodiment the rivets hold an enforcement layer in abutment against the heating mat surface which faces away from the spacer material layer, which enforcement layer only partially covers the area of the heating and ventilation inlay. The purpose of the enforcement layer is to prevent folding up of parts of the heating mat and formation of wrinkles of the heating mat with respect to the layer underneath. In principle it is possible that a portion of the heating mat between two adjacent rivets can be displaced with respect to the layer underneath and thus lead to fold formation. The reinforcement layer held in abutment on the outer surface of the heating mat prevents such fold formation.

In another embodiment the reinforcement layer is formed by a net of plastic threads which are connected to the heads of at least some of the rivets of the plurality of rivets.

In an embodiment a hose of flexible, air impermeable material is provided having a flexible, air permeable spacer fabric in its interior lumen to keep open a flow path through the hose even if the hose is laid with curved portions. The opposite end of the hose is arranged for connection to a fan or suction fan. Such an arrangement is advantageous in particular for a heating and ventilation inlay for a backrest of a vehicle seat since the fan or suction fan is in most cases disposed on the side of or beneath the vehicle seat and because therefore a conduit to the backrest is needed. The hose can for example be formed by two stripes of air impermeable material having inserted in-between a strip of air permeable spacer fabric, which two strips are connected to each other at their opposite lateral margins.

According to a further aspect the present invention provides a vehicle seat comprising a seat cushion and a backrest connected thereto, wherein in the cushion base body of at least one of the seat cushion and the backrest a heating and ventilation inlay according to one of the claims 1 to 7 is inserted in a complementary recess of the cushion base body. In addition a fan or suction fan is provided which is connected to the heating and ventilation inlay in the recess of the cushion base body, in order to transport air through the heating and ventilation inlay and the seat trim of the vehicle seat lying on top of that.

The present invention provide a heating and ventilation in-lay for a vehicle seat which can be handled as a single unit, which is simple to manufacture, which is of low weight and which presents a low flow resistance during operation of the ventilation.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Figure 1:
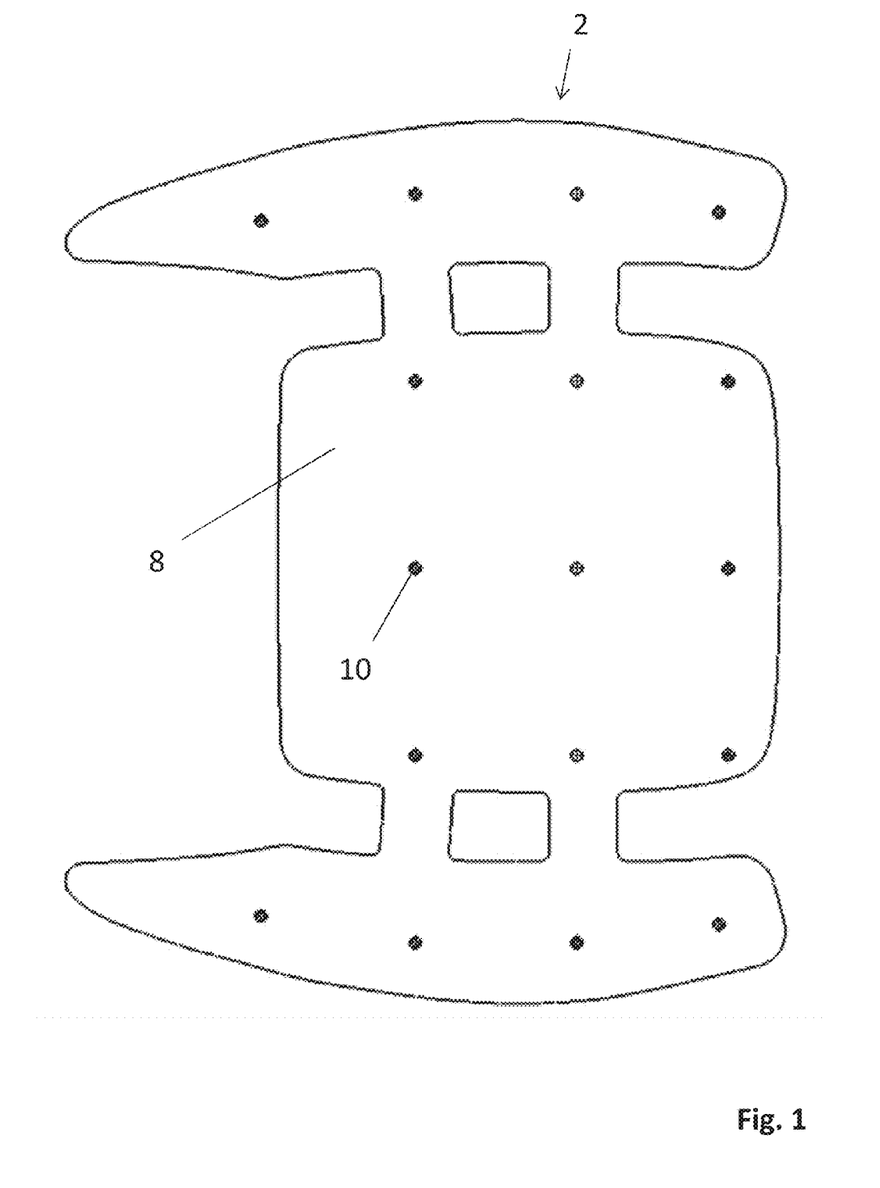
FIG. 1 shows a plan view of a heating and ventilation inlay from above.

FIG. 1 shows a schematic plan view of a heating and ventilation inlay from above, wherein the heating conductor of an upper heating mat 8 is not shown. The outer contour of the heating and ventilation inlay 2 is shaped and dimensioned such that the inlay fits into a complementary recess of a cushion body of a seat cushion or a backrest of a vehicle seat.

The heating and ventilation inlay is not continuous over the entire area within the outer contour but comprises a few openings as shown in FIG. 1. The openings may serve the purpose to receive complementary projections from the cushion base body of the seat cushion or the backrest. In other cases they may serve the purpose of allowing to vary the shape of the outer contour of the heating and ventilation inlay to a certain extent.

Figure 2:
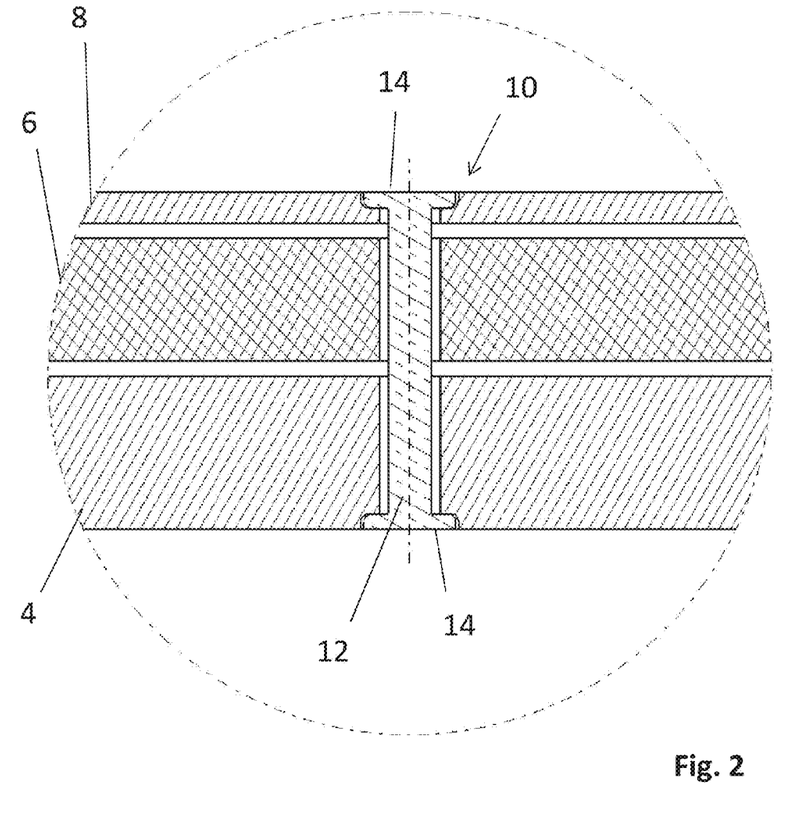
FIG. 2 shows a cross-sectional view of a portion of the heating and ventilation inlay of FIG. 1 in the region of a rivet.

The layer construction of the heating and ventilation inlay 2 can be seen in FIG. 2 which shows a small detail of the heating and ventilation inlay 2 in cross-section. The heating and ventilation inlay 2 comprises in this embodiment three layers on top of each other, namely a lower spacer fabric layer 4 and an upper heating mat 8, and an intermediate layer 6 which is located in between and which is made of reticulated foam having high air permeability.

The spacer fabric of the spacer fabric layer 4 as a three-dimensional woven or netted fabric provides for a very good air permeability. Air is pumped by a fan (not shown) from below into the spacer fabric layer 4. In an another embodiment air is conveyed by a fan through a hose into a side surface of the spacer fabric layer. The air supplied by the fan is distributed over the area of the spacer fabric layer 4 and flows into the intermediate layer 6 of reticulated foam and through the heating mat 8 and through the seat trim (not shown) on top of that.

The intermediate layer 6 of reticulated foam is intended to improve seating comfort as a cushion layer. The intermediate layer 6 makes sure that a passenger does not feel the spacer fabric layer 4 through the seat trim, which spacer fabric layer is not as soft as the intermediate layer 6 made of reticulated foam.

The shown layering comprising a spacer fabric layer 4, an intermediate layer 6 of reticulated foam, and heating mat 8 is connected to a layer composite which can be handled as a single unit, wherein the connection is achieved by a plurality of rivets 10 which are distributed over the area of the heating and ventilation inlay and which extend through the three layers in thickness direction. Each rivet 10 has a strand or stem 12, and at its opposite ends laterally enlarged heads 14. The enlarged heads 14 of the rivets are in abutment on the outer surfaces of the heating mat 8 and of the spacer fabric layer 4, respectively, so that the rivets 10 hold the layers mentioned tightly together.

The rivets 10 may consist of plastic. In an embodiment, so-called tag pins as rivets 10. Such tag pins consist of elastic plastic material and have a longitudinal strand or filament as a stem 12 and widened heads 14 at the opposite ends. Such tag pins are known from the textile industry where they are used for attaching price tags, labels and tags for which reason they are referred to as "tag pins". Tag pins are very cheap and can be automatically inserted by a machine into the layers of the heating and ventilation inlay to connect them to a layer compound.

Figure 3:
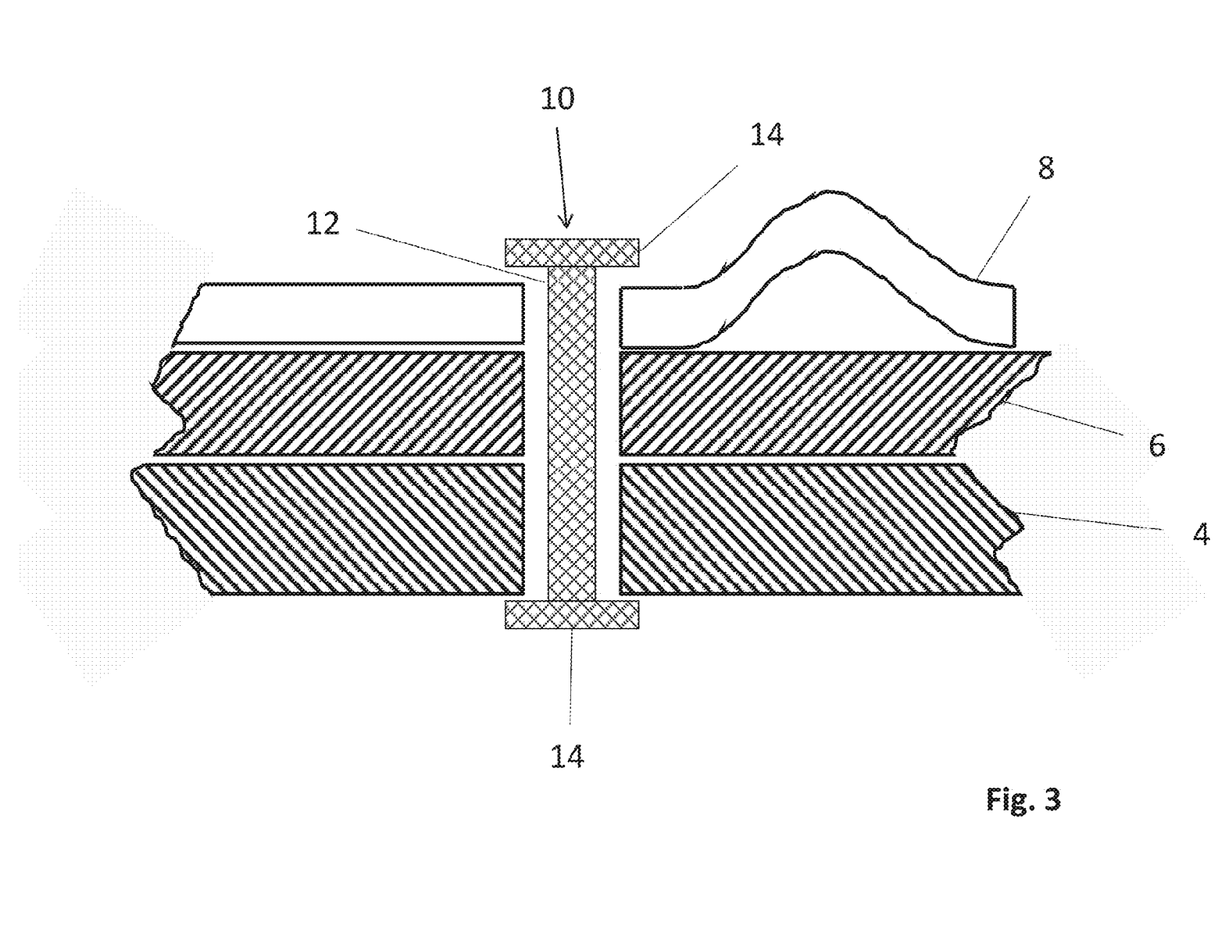
FIG. 3 shows a cross-sectional view of a portion of the heating and ventilation inlay of FIG. 1 in the region of a rivet.
Figure 4:
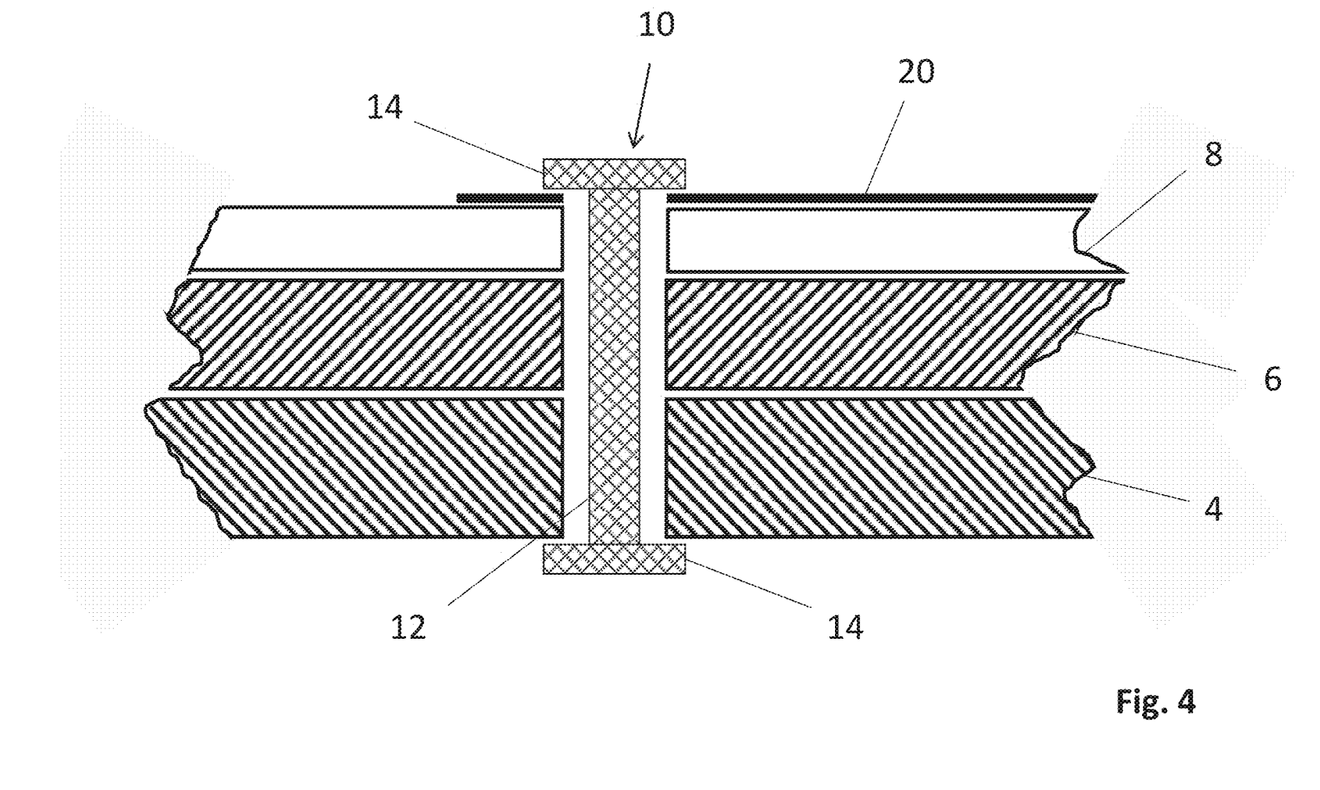
FIG. 4 shows a cross-sectional view of a portion of the heating and ventilation inlay in the region of a rivet for another embodiment.

In FIG. 3 an enlarged detailed view of the heating and ventilation inlay 2 is shown in cross-section. If forces are acting transversely along the surface of the heating mat 8 portions of the heating mat 8 can be shifted with respect to the intermediate layer 6 lying underneath and can unfold, as shown in FIG. 3, which may cause formation of plications in the heating mat. In order to prevent this a reinforcement layer 20 is held in abutment from above on the heating mat 8, as shown in FIG. 4. The reinforcement layer should cover a small part of the surface area of the heating and ventilation inlay 2 only so that air permeability is not unnecessarily restricted.

Figure 5:
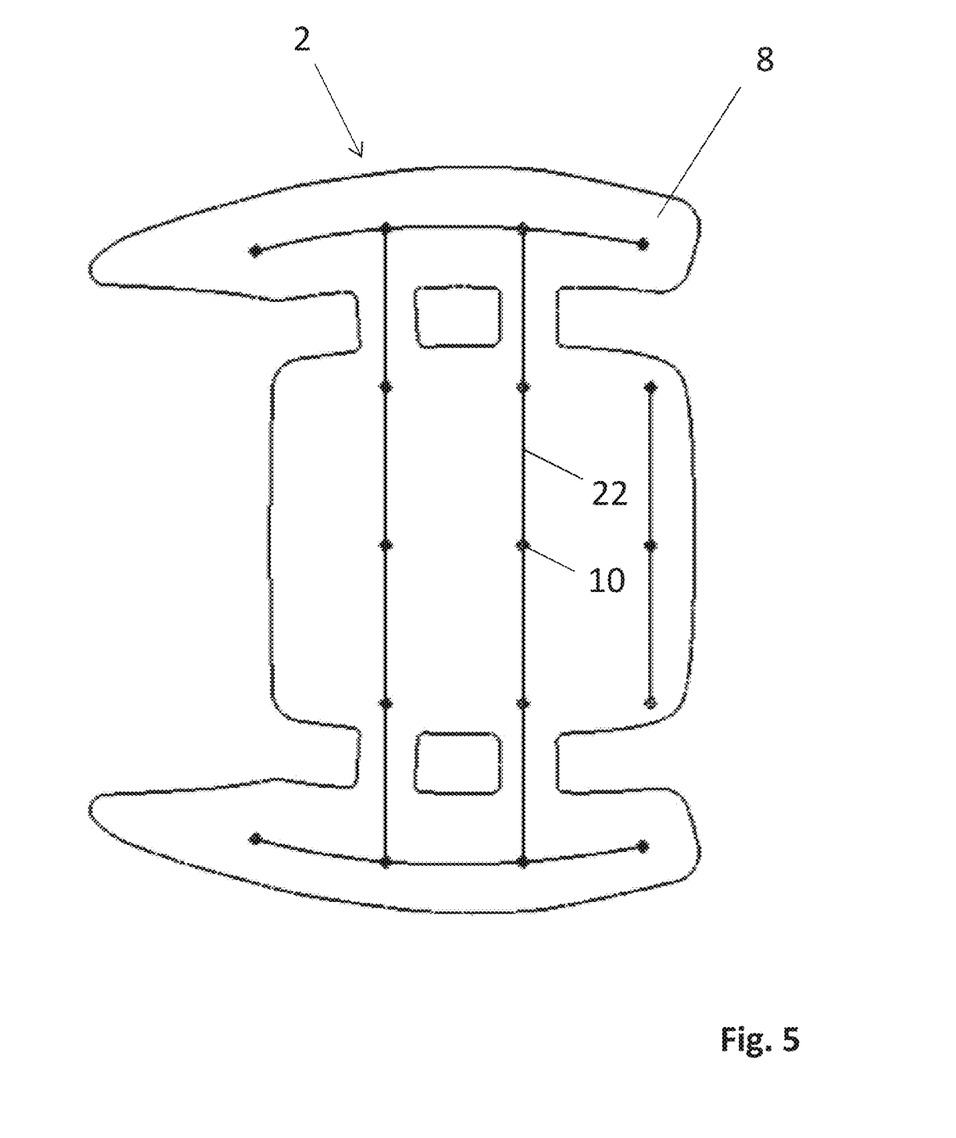
FIGS. 5-7 in each case show a plan view of a heating and ventilation inlay according to different embodiments as in FIG. 1 from above.

In an embodiment the reinforcement layer 20 is formed by a net of plastic threads 22 which are held by rivets 10 in abutment on the surface of the heating mat 8, as shown in FIG. 5. The plastic threads 22 can be connected to each other at points were they intersect or cross other plastic threads so that an integral net of plastic threads is formed. The net of plastic threads may comprise eyelets at places where it is connected to rivets 10 wherein a stem 12 of a rivet 10 is guided through each eyelet such that the eyelet is held by a head 14 on the surface of the heating mat 8.

Figure 6:
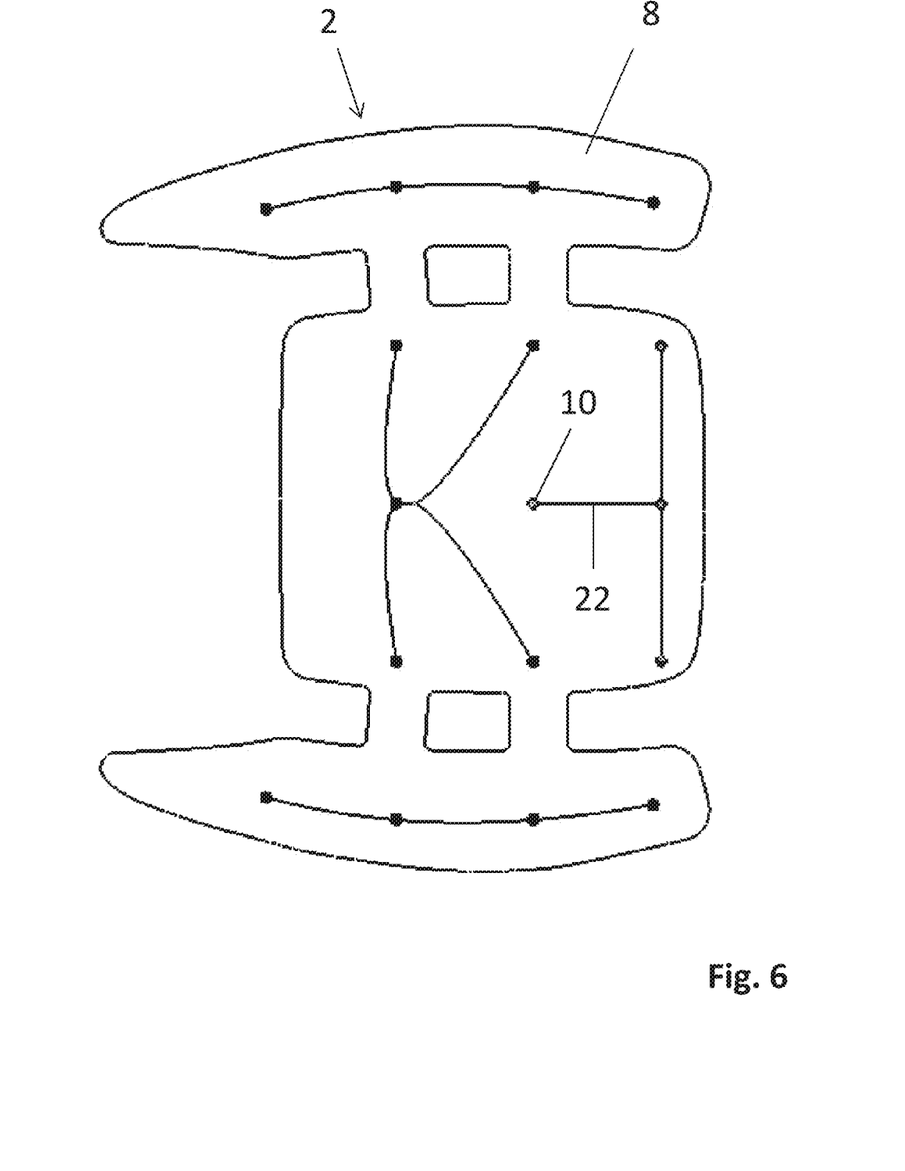
Figure 7:
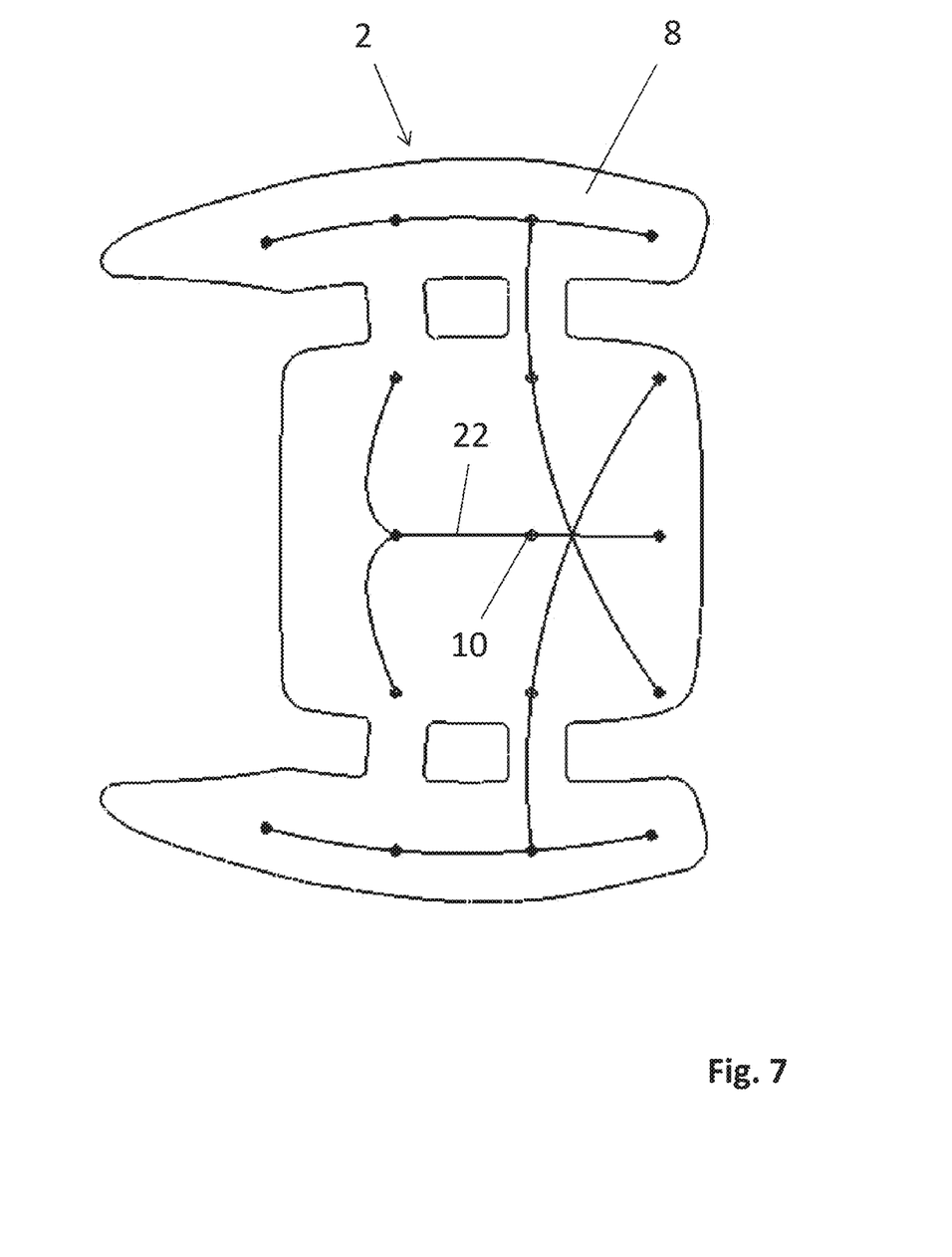

Further exemplary arrangements of plastic threads 22 on the heating mat 8 are shown in plan views in FIGS. 6 and 7. These plastic threads 22 act as a net pressing the heating mat 8 onto the intermediate layer 6 lying underneath such that the risk of formation of plications and folds in the heating mat is substantially reduced.

It can be seen that the plurality of a rivets 10 connect the layer stack of the heating and ventilation inlay to a multi-layer composite which can be handled as a unit and which may be shipped as a unit from the manufacturer to the vehicle manufacturer and which can be mounted there as a whole in a vehicle seat. It can be seen that at the same time the tag pins have a minimal influence on the air permeability of the heating and ventilation inlay 2, i.e. the inlay as whole maintains its high air permeability since the air permeable total surface area is not reduced by the tag pins to any noticeable extent.

A fan which supplies air flow to the heating and ventilation inlay is usually located beside or underneath the vehicle seat. The heating and ventilation inlay in the seat cushion body can thus be supplied with airflow via a feed line merging into the spacer fabric layer 4 from below. For this purpose a feed conduit extends from the fan through the seat cushion body and merges into the recess from below, in which recess the heating and ventilation inlay 2 is placed. For a heating and ventilation inlay for the backrest of a vehicle seat it is desired to arrange a hose from the fan to the backrest, which hose opens into a sidewall of the spacer fabric layer. The hose consists of flexible material and contains in its interior a spacer fabric extending along the flow path of the hose, which spacer fabric is intended to ensure that also in curved portions of the hose a flow path is kept open in the hose.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A heating and ventilation inlay for a vehicle seat comprising:
   an inlay adapted to be placed in a complementary recess in a seat cushion or backrest of the vehicle seat and disposed underneath a seat trim, wherein the heating and ventilation inlay comprises:

an arrangement of layers including an air permeable heating mat having a heating conductor arranged on the heating mat, and an air permeable layer of spacer material positioned underneath the heating mat that is connected to a fan or a suction fan to transport air conveyed by the fan or the suction fan through the heating and ventilation inlay, wherein the heating mat and the layer of spacer material are connected to each other to form a composite unitary component, the heating mat and the layer of spacer material being connected by a plurality of rivets distributed over an area of the heating and ventilation inlay and that pierce through the heating mat and the spacer material layer, and an enforcement layer disposed between at least two of the plurality of rivets, the enforcement layer being coupled in abutment with a surface of the heating mat by the at least two rivets.

2. The heating and ventilation inlay according to claim 1, wherein:

an intermediate layer of reticulated foam is disposed between the heating mat and the spacer material layer, and the reticulated foam layer is pierced by the rivets connecting the heating mat and the spacer material layer.

3. The heating and ventilation inlay according to claim 1, wherein:

an intermediate layer of perforated foam is disposed between the heating mat and the spacer material layer, and the perforated foam layer is pierced by the rivets connecting the heating mat and the spacer material layer.

4. The heating and ventilation inlay according to claim 3, wherein a size and a density of perforations of the perforated foam varies over an area of the intermediate layer to distribute the transported air.

5. The heating and ventilation inlay according to claim 1, characterized in that the rivets are made from a plastic material.

6. The heating and ventilation inlay according to claims 5, wherein the rivets are tag pins.

7. The heating and ventilation inlay according to claim 1, wherein:

the at least two rivets hold the enforcement layer in abutment against the surface of the heating mat such that the surface of the heating mat faces away from the spacer material layer, the enforcement layer only partially covers the area of the heating and ventilation inlay to prevent folding up of parts of the heating mat and formation of wrinkles of the heating mat.

8. The heating and ventilation inlay according to claim 1, further comprising:

a hose that extends into a side surface of the air permeable spacer material layer, the hose being made of flexible, air impermeable material, wherein in an interior of the hose, a flexible, air permeable spacer material is disposed, wherein an end of the hose is positioned remote from the heating and ventilation inlay and is adapted to connect with the fan or to the suction fan.

9. A heating and ventilation inlay for a vehicle seat, comprising:

an inlay adapted to be placed in a complementary recess in a seat cushion or backrest of the vehicle seat and disposed underneath a seat trim, wherein the heating and ventilation inlay comprises:

an arrangement of layers including an air permeable heating mat having a heating conductor arranged on the heating mat;

an air permeable layer of spacer material positioned underneath the heating mat that is connected to a fan or a suction fan to transport air conveyed by the fan or the suction fan through the heating and ventilation inlay; and wherein the heating mat and the layer of spacer material are connected to each other to form a composite unitary component, the heating mat and the layer of spacer material being connected by a plurality of rivets distributed over an area of the heating and ventilation inlay and that pierce through the heating mat and the spacer material layer;

the rivets hold an enforcement layer in abutment against a surface of the heating mat that faces away from the spacer material layer;

the enforcement layer only partially covers the area of the heating and ventilation inlay to prevent folding up of parts of the heating mat and formation of wrinkles of the heating mat;

wherein the enforcement layer is formed by a net of plastic threads which are connected to the heads of at least some of the rivets of the plurality of rivets.

10. A vehicle seat comprising:

a seat cushion and a backrest connected thereto, wherein at least one of the seat cushion and the backrest includes a recess;

a heating and ventilation inlay comprising:

an inlay adapted to be placed in the recess and disposed underneath a seat trim, wherein the heating and ventilation inlay comprises:

an arrangement of layers including an air permeable heating mat having a heating conductor arranged on the heating mat;

an air permeable layer of spacer material positioned underneath the heating mat that is connected to a fan or a suction fan to transport air conveyed by the fan or the suction fan through the heating and ventilation inlay; and wherein the heating mat and the layer of spacer material are connected to each other to form a composite unitary component, the heating mat and the layer of spacer material being connected by a plurality of rivets distributed over an area of the heating and ventilation inlay and that pierce through the heating mat and the spacer material layer;

wherein the fan communicates with the heating and ventilation inlay in the recess, and is configured to convey air through the heating and ventilation inlay and the seat trim.

11. A heating and ventilation inlay for a vehicle seat comprising:

an arrangement of layers including an air permeable heating mat having a heating conductor, and an air permeable layer of spacer material positioned directly adjacent the heating mat;

a fan or a suction fan fluidly coupled with the layer of spacer material to transport air conveyed through the heating and ventilation inlay;

a plurality of rivets distributed over an the area of the heating and ventilation inlay and that pierce through the heating mat and the spacer material layer, wherein the heating mat and the layer of spacer material are connected to each other by the plurality of rivets to form a composite unitary component, and an enforcement layer formed by a net of plastic threads disposed between at least two rivets of the plurality of rivets, the enforcement layer being coupled in abutment with a surface of the heating mat by the at least two rivets.

12. The heating and ventilation inlay of claim 11, wherein the net of plastic threads are connected to a head of the at least two rivets of the plurality of rivets.

13. The heating and ventilation inlay of claim 11, wherein the enforcement layer includes a plurality of enforcement layers, each of the plurality of enforcement layers being disposed between a pair of the plurality of rivets.

14. The heating and ventilation inlay of claim 13, wherein the net of plastic threads includes at least two eyelets, each of the at least two eyelets being captured by the at least two rivets.

15. The heating and ventilation inlay of claim 14, wherein ear of the plurality of rivets includes a head portion and a stem, each of the eyelets being disposed on the stem and held on the surface by the head portion.

16. The heating and ventilation inlay of claim 13, wherein at least two of the plurality of enforcement layers intersect to form an integral net of plastic threads.

17. The heating and ventilation inlay of claim 13, wherein the net of plastic threads press the heating mat into the layer of spacer material.

18. The heating and ventilation inlay of claim 17, further comprising a spacer fabric layer coupled to the heating mat and spacer material by the plurality of rivets.

19. The heating and ventilation inlay of claim 13, wherein the plurality of enforcement layers cover a portion of the heating mat.

20. The heating and ventilation inlay of claim 13, wherein each of the plurality of rivets is made from a plastic material.

* * * * *